United States Patent Office 2,713,000
Patented July 12, 1955

2,713,000

METHOD OF MAKING FOODS

Harry R. Ansel, Elmwood Park, Ill., assignor to Wm. J. Stange Co., Chicago, Ill., a corporation of Illinois No Drawing. Application September 27, 1952,
Serial No. 311,953

7 Claims. (Cl. 99—140)

The present invention relates to an improved method of preparing spices, and more particularly to an improved method of preparing spices from black pepper berries.

Several well-known methods have been developed for preparing black pepper berries to provide different forms of seasoning. Among these methods is the well-known solvent extraction process for removing black pepper oleoresin from the berries for making so-called dry soluble seasonings. Another method is to grind the whole berry for the preparation of ordinary powdered black pepper as a black pepper paste. Still another method is the making of white pepper by removing the black outer shell from the pepper berries and then grinding the remainder of the berries. The present invention relates to an improved method in which the above mentioned processes, most of which are conventional and well-known processes, may be utilized, by which improved method any given bulk shipment of commercially available black pepper berries may be more efficiently and economically processed to produce seasoning materials therefrom.

It is well known that the quality of the individual pepper berries in any given commercially available bulk shipment varies considerably. Such a shipment includes what is known in the art as "light" berries as well as "heavy" berries. By "light" berries is meant those berries having relatively lower specific gravities than other berries in the same shipment. One characteristic of the light berries is that they have a rough or shrivelled appearance, while the relatively heavy berries are generally firm, dense, and substantially round. It has been found that another characteristic of the light berries is that they generally contain a higher percentage of oleoresin than the heavy berries.

When making so-called dry soluble seasonings, the oleoresin is removed from the berries by a well-known solvent extraction process and then coated upon a suitable carrier, such as salt crystals. Such a seasoning generally comprises, for example, about 95% salt crystals with 5% black pepper oleoresin. It is, therefore, seen that if the oleoresin recovery from a given quantity of black pepper berries is 5%, an equal quantity of dry soluble seasoning can be prepared, since dry soluble 5% oleoresin seasoning has equal seasoning power in most food products to that of ground black pepper. It follows that if, for example, the yield from 100 pounds of pepper berries was 10% or 10 pounds of oleoresin, 200 pounds of dry soluble seasoning could be produced.

It has been found that regardless of the percentage of oleoresin content in a given group of berries, the cost of solvent extraction of the oleoresin remains substantially constant, because labor overhead and solvent loss is substantially constant. Therefore, it is clear that the higher the oleoresin content of the berries, the lower the cost per pound of extracted oleoresin, because the fixed cost may be spread over a greater number of pounds. It has been found that the oleoresin content of various portions of a given shipment of pepper berries may vary from as little as about 8% for one portion to as much as 18% or more for another portion.

It is an object of the present invention to provide a method of processing pepper berries to convert them into useable seasoning materials more efficiently and economically.

A further object of the invention is to provide a method by which higher yields of oleoresin are obtained from solvent extraction of pepper berries.

A still further object is to provide a method for processing pepper berries to convert them into useable seasoning materials by means of which the monetary value of a given lot of pepper berries is increased.

Other objects will appear hereinafter.

It has now been found that the foregoing objects are accomplished by separating a mass of pepper berries into at least two fractions, one of which has a relatively lower specific gravity than the other and then processing only the fraction of lower specific gravity by the solvent extraction method to recover the oleoresin content of such lower specific gravity fraction. Preferably the fraction of higher specific gravity is subjected to a grinding process, with or without decortication and in the presence or absence of added liquid to produce ground pepper products therefrom or alternatively the heavier fraction may be marketed as whole berries, since this fraction will generally bring a higher price per pound in the market than the price obtainable for the entire mass of berries.

The separation of the black pepper berries of a given mass or bulk shipment into various fractions in which the berries of one fraction have a relatively lower specific gravity than the berries of other fractions may be accomplished in any desired manner. In accordance with the preferred procedure this separation is quickly and economically performed by an air flotation process which may be accomplished by any of several well-known machines available on the open market. These machines generally include a foraminous inclined deck through which an upwardly directed stream of air is blown. The pepper berries are placed on the deck, which is then rapidly vibrated so that the heavy berries which sink to the deck are conveyed to one portion of an edge of the deck for discharge into one hopper, while the lighter berries are floated by the air to another portion of an edge of the deck for discharge into another hopper. Since machines for carrying out this process are well known in the art, further description is unnecessary.

The fraction containing the light berries or the berries having the relatively lower specific gravity is then subjected to the well-known solvent extraction process for removing the oleoresin therefrom. The fraction containing the berries having a relatively high specific gravity is removed from the hopper and preferably subjected to a grinding and/or decortication process for producing either black pepper or white pepper or as indicated above it may be sold as such.

As illustrative of the efficiency of the process of this invention, one specific example of the treatment of 100 pounds of black pepper berries will be given. The 100 pound mass of pepper berries was separated by an air flotation process into six fractions, as follows:

|   | Percent of Total Weight | Percent of Extracted Oleoresin |
|---|---|---|
| 1 | .89 | 8.75 |
| 2 | 62.42 | 9.7 |
| 3 | 10.82 | 14.4 |
| 4 | 11.00 | 17.5 |
| 5 | 11.74 | 16.4 |
| 6 | 3.13 | 18.0 |

The average specific gravity of the berries in the above listed fractions decreases from fraction #1 through fraction #6. Furthermore, it is seen that the berries in fraction #1, which have the highest specific gravity, have the lowest percent of oleoresin, while the berries in fraction #6, which have the lightest specific gravity, have the highest oleoresin content. The berries in the above fractions #1 and #2 total 63.31% of the total sample and would give an average yield of 9.6% oleoresin. This low resin recovery rate is not suitable for economic solvent extraction for dry soluble seasonings. The above fractions #3 to #6 were combined, and the oleoresin extracted therefrom and an average yield of 15.9% oleoresin was obtained. Since the average yield of the entire 100-pound sample would be only 12% of oleoresin, it is seen that by subjecting only the berries of the fractions having relatively lower specific gravities and higher oleoresin content, a substantial economy is effected in the cost of the extraction of each pound of oleoresin. The remaining fractions of the relatively heavy berries may then be subjected to the usual grinding processes for producing either black or white pepper. As pointed out above, these heavy berries are firm and round and may be ground with greater efficiency than the lighter berries which have a more or less shrivelled appearance.

From the above description, it is readily seen that this invention provides a novel process, whereby the seasoning power of a given bulk shipment of black pepper berries may be increased by reason of the fact that only the light berries which have a relatively high oleoresin content are subjected to the oleoresin extraction process, and only the relatively heavy berries, which produce a better grade of ground pepper, are subjected to the grinding or decortication processes. In addition, it is seen that by reason of the novel process set forth herein both dry soluble seasonings and ground pepper may be produced much more economically from a given bulk shipment of black pepper berries than has heretofore been accomplished by methods of the prior art.

While the preferred method for separating a group of berries into a plurality of fractions in accordance with their specific gravities has been disclosed as an air flotation process, it is obvious that any other method for separating the berries could be used without departing from the spirit of this invention. Therefore, it is understood that this invention is not limited by the exact processes disclosed herein, but only by the appended claims.

I claim:

1. A method of preparing seasoning material from a mass of pepper berries of varying specific gravities, which comprises extracting oleoresin only from a portion of the berries having relatively low specific gravities thereby obtaining a higher yield of oleoresin.

2. A method of preparing seasoning material from a mass of pepper berries of varying concentrations of oleoresin, which comprises separating the mass of berries into two fractions, one of which has an oleoresin content at least 50 percent higher than the other, and extracting oleoresin only from the fraction having the higher oleoresin content.

3. A method of preparing seasoning material from a mass of pepper berries of varying concentrations of oleoresin, which comprises separating said mass of berries into a plurality of fractions according to concentration of oleoresin, and subjecting only the fractions of berries having relatively higher concentrations of oleoresin to a solvent extraction process to extract oleoresin therefrom.

4. A method of preparing seasoning material from a mass of pepper berries of varying concentrations of oleoresin, which comprises separating said mass of berries into a plurality of fractions according to concentrations of oleoresin, and subjecting only the fractions having relatively lower concentration of oleoresin to a grinding process for producing ground pepper.

5. A method of preparing seasoning material from a mass of pepper berries of varying specific gravities and concentrations of oleoresin, which comprises subjecting said mass of berries to an air flotation process to separate said mass into a plurality of fractions according to specific gravity, and subjecting only the fractions of berries having relatively lower specific gravities and higher concentrations of oleoresin to a solvent extraction process to extract oleoresin therefrom.

6. A method of preparing seasoning material from a mass of pepper berries of varying concentrations of oleoresin, which comprises separating said mass of berries into a plurality of fractions according to the concentrations of oleoresin, subjecting the separated berries having relatively higher concentration of oleoresin to a solvent extraction process to extract oleoresin therefrom and subjecting the separated berries of relatively lower concentrations of oleoresin to a grinding process to produce ground pepper.

7. A method of preparing seasoning material from a mass of pepper berries of varying specific gravities and concentrations of oleoresin, which comprises subjecting said mass of berries to an air flotation process to separate said mass into a plurality of fractions according to specific gravity, subjecting the separated berries having relatively lower specific gravities and higher concentrations of oleoresin to a solvent extraction process to extract oleoresin therefrom and subjecting the separated berries of relatively higher specific gravity and lower concentrations of oleoresin to a grinding process to produce ground pepper.

References Cited in the file of this patent

UNITED STATES PATENTS

| | | |
|---|---|---|
| 2,079,415 | Levinson | May 4, 1937 |
| 2,384,532 | Bush et al. | Sept. 11, 1945 |

FOREIGN PATENTS

| | | |
|---|---|---|
| 22,287 | Great Britain | A. D. 1893 |

OTHER REFERENCES

"Modern Encyclopedia of Cooking" by Meta Given, vol. I., J. G. Ferguson and Associates, Chicago, 1949, page 307.